(12) United States Patent
Ahler et al.

(10) Patent No.: US 8,939,299 B2
(45) Date of Patent: Jan. 27, 2015

(54) METHOD FOR HANDLING AND/OR SERVICING COMPONENTS OF A WIND TURBINE AND A GRIPPING APPARATUS FOR PERFORMING THE METHOD

(75) Inventors: Claus Ahler, Tarm (DK); Jesper Stærke Rosengren, Jelling (DE); Hans-Christoph Paul, Brande (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1152 days.

(21) Appl. No.: 12/809,759

(22) PCT Filed: Dec. 19, 2008

(86) PCT No.: PCT/DK2008/050327
§ 371 (c)(1),
(2), (4) Date: Feb. 11, 2011

(87) PCT Pub. No.: WO2009/080047
PCT Pub. Date: Jul. 2, 2009

(65) Prior Publication Data
US 2011/0168654 A1 Jul. 14, 2011

Related U.S. Application Data

(60) Provisional application No. 61/015,979, filed on Dec. 21, 2007.

(30) Foreign Application Priority Data

Dec. 21, 2007 (DK) ................................. 2007 01863

(51) Int. Cl.
*B66C 13/06* (2006.01)
*F03D 1/00* (2006.01)
*B66C 23/20* (2006.01)

(52) U.S. Cl.
CPC .............. *F03D 1/001* (2013.01); *B66C 23/207* (2013.01); *F03D 1/005* (2013.01); *F05B 2230/61* (2013.01); *F05B 2240/916* (2013.01); *Y02E 10/726* (2013.01); *Y02E 10/728* (2013.01)
USPC ......................................... 212/270; 212/309

(58) Field of Classification Search
CPC ............................ B66C 23/207; B66C 23/185
USPC ...................................... 212/270, 309
See application file for complete search history.

(56) References Cited

U.S. PATENT DOCUMENTS 1,716,905 A * 6/1929 Smith ............................. 294/90
2,151,294 A * 3/1939 Ellingsen ..................... 384/428
(Continued)

FOREIGN PATENT DOCUMENTS

DE  196 47 515  5/1998
DE  197 41 988  4/1999
(Continued)

OTHER PUBLICATIONS

Jens Skou; Examination Report issued in priority Denmark Patent Application No. PA 2007 01863; Sep. 22, 2008; 4 pages; Denmark Patent and Trademark Office.
(Continued)

*Primary Examiner* — Emmanuel M Marcelo
*Assistant Examiner* — Michael Gallion
(74) *Attorney, Agent, or Firm* — Wood, Herron & Evans, LLP

(57) ABSTRACT

A method and an apparatus for handling and/or servicing components of a wind turbine, such as installing and/or dismantling components into or from a wind turbine nacelle or such as servicing exterior components such as blades, hub, tower and nacelle of the wind turbine are disclosed. The gripping apparatus comprising at least one arm for gripping around the wind turbine tower, the at least one arm capable of forming a gap between gripping elements of the gripping apparatus. The at least one arm extends around the entire outer circumference, seen perpendicular to a horizontal plane, of the wind turbine tower.

37 Claims, 11 Drawing Sheets

(56) References Cited

U.S. PATENT DOCUMENTS

Figure 1A:
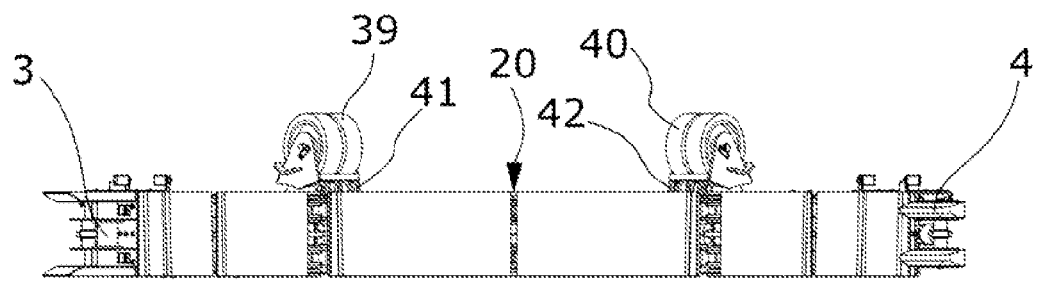

| | | | | |
|---|---|---|---|---|
| 2,722,450 | A * | 11/1955 | Nelson | 294/90 |
| 3,789,565 | A * | 2/1974 | Lindholm | 52/745.01 |
| 5,746,262 | A * | 5/1998 | Baumgartner | 144/24.13 |
| 6,494,273 | B1 * | 12/2002 | Martin | 175/220 |
| 6,522,025 | B2 * | 2/2003 | Willis et al. | 290/55 |
| 6,725,972 | B1 * | 4/2004 | Krier et al. | 182/187 |
| 6,868,646 | B1 * | 3/2005 | Perina | 52/745.17 |
| 7,044,216 | B2 * | 5/2006 | Otten et al. | 166/77.52 |
| 7,708,072 | B1 * | 5/2010 | Hunziker | 166/301 |
| 7,866,721 | B2 * | 1/2011 | Hollin | 294/90 |
| 8,079,627 | B2 * | 12/2011 | Lutzhoft et al. | 294/90 |
| 8,083,029 | B2 * | 12/2011 | Teichert | 182/128 |
| 8,201,787 | B2 * | 6/2012 | Ingram et al. | 248/218.4 |
| 8,353,141 | B2 * | 1/2013 | Berg | 52/745.04 |
| 8,496,280 | B2 * | 7/2013 | Pietras | 294/90 |
| 2002/0009333 | A1 * | 1/2002 | Willis et al. | 405/158 |
| 2003/0183594 | A1 * | 10/2003 | Torres Martinez | 212/196 |
| 2004/0011592 | A1 * | 1/2004 | Lee et al. | 182/187 |
| 2006/0175465 | A1 * | 8/2006 | Teichert | 244/33 |
| 2008/0150305 | A1 * | 6/2008 | Hollin | 294/102.2 |
| 2010/0139062 | A1 * | 6/2010 | Reed et al. | 29/23.51 |
| 2010/0150684 | A1 * | 6/2010 | Pedersen et al. | 414/10 |

FOREIGN PATENT DOCUMENTS

| | | |
|---|---|---|
| DE | 200 18 890 | 12/2001 |
| DE | 10 2005 025 646 | 12/2006 |
| EP | 1 350 953 | 10/2003 |
| EP | 1 857 670 | 11/2007 |
| GB | 2 356 355 | 5/2001 |
| WO | 2004/092577 | 10/2004 |
| WO | 2005/064152 | 7/2005 |
| WO | 2006/077358 | 7/2006 |

OTHER PUBLICATIONS

Translation of the Examination Report issued in priority Denmark Patent Application No. PA 2007 01863; Sep. 22, 2008; 4 pages; Denmark Patent and Trademark Office.

* cited by examiner

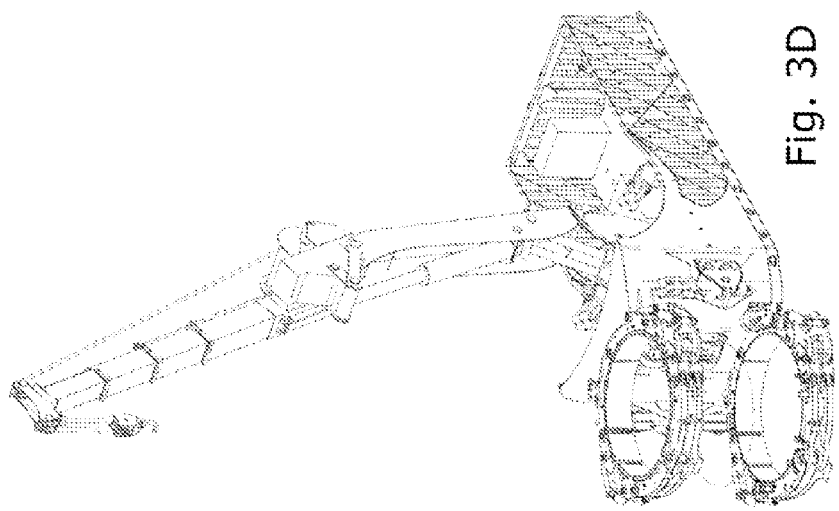
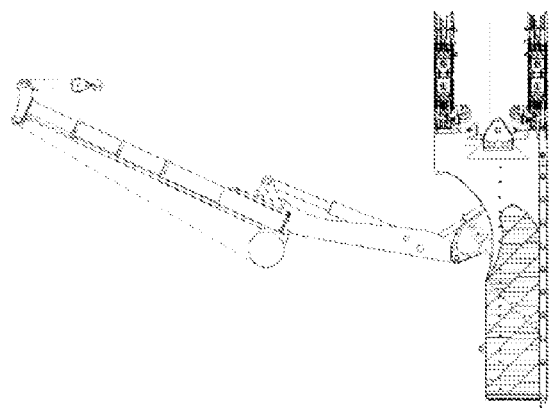
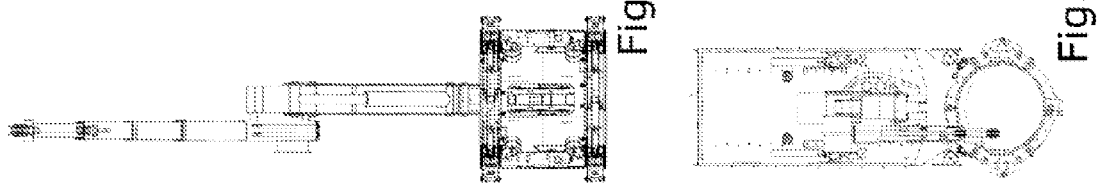
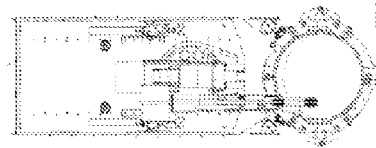

METHOD FOR HANDLING AND/OR SERVICING COMPONENTS OF A WIND TURBINE AND A GRIPPING APPARATUS FOR PERFORMING THE METHOD

FIELD OF THE INVENTION

The invention relates to a method of handling and/or servicing components of a wind turbine, such as installing and/or dismantling components into or from a wind turbine nacelle or such as servicing exterior components such as blades, hub, tower and nacelle of the wind turbine. The invention also relates to a gripping apparatus for installing or dismantling components into or from a wind turbine nacelle. Furthermore, the invention relates to a method of installing a wind turbine by means of a gripping apparatus and to a wind turbine comprising a gripping apparatus.

BACKGROUND

Cranes for handling such as installing and dismantling of components of a wind turbine nacelle and cranes for handling and/or servicing outer components of the wind turbine are often provided as a stationary part or an intermediate part of the nacelle as such. The components of the nacelle may be any component. The major components of the nacelle are the generator, the gear box if such is provided and a transformer if such is provided. Possibly also a main shaft and bearings may be major components of the nacelle. The outer components of the wind turbine may be the blades, the hub, the nacelle itself and the tower.

Other solutions of cranes have been proposed, where the cranes do not form part of the nacelle as such, and where the cranes are intended for being attached to the wind turbine tower.

WO 2006/077358 discloses a self-advancing climbing device including two clamps, and a method of coupling such a clamp to, for example, a wind turbine tower. The clamp comprises at least one clamp member in the form of a friction pad adapted to grip the tower, and at least one flexible elongate element in the form of a tendon adapted to exert a force on the friction pad to urge the pad to grip the tower, whereby the pad and the tendon are adapted to exert a substantially uniform radial clamp load on the tower. The tendon and the pad form part of a rigid frame having a fixed size in relation to the circumferential size of the wind turbine tower.

WO 2004/092577 discloses a method of servicing the outer components of a wind turbine such as the wind turbine blades and the tower with a work platform. The method comprises the steps of positioning the work platform at the wind turbine tower and connecting the work platform to an upper part of the wind turbine with at least one cable. Furthermore the method comprises the steps of raising the work platform with the cable and cable winding means to a position of use, and holding the work platform to the side of the wind turbine tower with holding means. The invention also relates to a work platform for servicing the outer components of a wind turbine. The work platform is held in position of use by being suspended from the cables and is only intended for servicing outer components of the wind turbine, mainly for servicing the blades.

DE 196 43 515 discloses a mechanism with two or more parts with a foot and a head temporarily forming a unit with the wind turbine tower, to which the foot and head are detachably secured. The mechanism has two or more hydraulic rams, giving a climbing sequence. The jib of the mechanism is equipped with a rope, by which the sections of the tower are successively placed one above the other. After this, the nacelle with gearbox generator and rotor blades is installed, and descent takes place using the mechanism in the reverse climbing sequence. The climbing mechanism is either dependent on individualised gripping features being provided as at least an intermediate part of the wind turbine tower as such or the climbing mechanism comprises a rigid frame having a fixed size in relation to the circumferential size of the wind turbine tower.

SUMMARY OF THE INVENTION

It may be seen as an object of the present invention to reduce the time needed for installing and for dismantling a crane for a wind turbine. It may also be seen as an object of the present invention to reduce the costs for installing and for dismantling a crane for a wind turbine. It may furthermore be seen as an object to reduce the costs for manufacturing a crane for a wind turbine. It may even further be seen as an object to increase the safety when working with a crane of wind turbine and/or when working on a work platform of a crane for a wind turbine. It may still even further be seen as an object of the present invention to provide a method and a work platform capable of being used for different sized wind turbine towers, the towers differing in circumferential shape and size.

The objects of the invention may be obtained by a method of handling and/or servicing components of a wind turbine, the method comprising the steps of:
  positioning a handling and/or servicing equipment in vicinity of a lower part of a wind turbine tower previously having been installed at a wind turbine site,
  connecting the handling and/or servicing equipment to an upper part of the wind turbine with at least one cable being suspended from the upper part,
  raising the handling and/or servicing equipment to a position of use by means of the at least one cable by use of cable winding or hoisting equipment, and
  holding the handling and/or servicing equipment onto a side wall of the wind turbine tower by use of at least one gripping apparatus,
  the at least one gripping apparatus comprising at least one arm for gripping around the wind turbine tower,
  one of said gripping elements being provided at an outer end of the at least one arm, and said gripping elements capable of being mutually joined,
  the at least one arm being encircled around the wind turbine tower thereby reducing the gap between the gripping elements of the gripping apparatus, and
  mutually joining said gripping elements, and when the gripping elements are mutually joined, forming an annular circumferential gripping of the handling and/or servicing equipment to the wind turbine tower,
  said annular gripping extending around the entire outer circumference, seen perpendicular to a horizontal plane, around the wind turbine tower.

The objects of the invention are also obtained by a gripping apparatus for mounting equipment to a wind turbine tower, the gripping apparatus comprising
  at least one arm for gripping around the wind turbine tower, the at least one arm, in one configuration, forming a gap, and in a second configuration, forming a mutual joining, between a first gripping element and a second gripping element, and where
  the first gripping element and the second gripping element capable of being mutually joined, the at least one arm, when the first gripping element and the second gripping element are mutually joined, forming an annular gripping apparatus intended for encircling the outer circumference of a wind turbine tower.

By providing a gripping apparatus with at least one arm, and where the at least one arm extends around the entire circumference of the wind turbine tower, the at least one arm will hold the gripping apparatus to the wind turbine tower without any need for supplemental equipment for holding the gripping apparatus and also without any need for individualised gripping features along the wind turbine tower.

Also, when the arms of the gripping apparatus are capable of increasing and reducing the gap between the outer ends of the arms, the gripping apparatus including any handling and/or servicing equipment such as a work platform and/or a crane and/or other equipment may be held to the one and same wind turbine having different circumferential dimensions along the wind turbine tower, or may be held to different wind turbines having different circumferential cross-sections along the wind turbine tower.

According to a possible embodiment the at least one arm comprises a sequence of a plurality of sections, where each section is pivotally connected to adjacent sections, the plurality of sections of the at least one arm being controlled by a plurality of actuators for pivoting the plurality of sections in relation to each other, thereby increasing or reducing the gap between the first gripping element and the second gripping element.

Having the at least one arm divided into a sequence of plurality of sections being mutually pivotable results in an arm being very flexible, both when the gripping apparatus is transported to the wind turbine site and when the gripping apparatus is used for gripping around the circumference of the wind turbine at the site. The at least one arm may be collapsed during transport and the at least one arm may grip wind turbine towers of different diameters and of different cross-sections. Possibly, one or more of the sections may be added or may be omitted, thereby adjusting the circumference, i.e. the circumferential distance and/or the circumferential shape, of the wind turbine tower which the at least one arm is capable or is intended for gripping around.

According to the above aspect of the invention, the plurality of actuators may be intended for pivoting the plurality of sections in relation to each other in an outwards and inwards sideway direction in a substantially horizontal plane.

When the gripping apparatus is intended for gripping around a wind turbine tower, gripping will take place in a substantially horizontal plane, and thus pivoting of the sections of the at least one arm will be an inwards or outwards sideway pivoting.

According to an embodiment of the invention, the gripping apparatus comprises at least two arms for gripping around the wind turbine tower, an outer end of the one arm being provided with a first gripping element and an outer end of another arm being provided with a second gripping element, and the gripping elements capable of being mutually joined, the at least two arms being encircled around the wind turbine tower, thereby reducing a gap between the gripping elements of the gripping apparatus, and mutually connecting the outer end of the one arm and the outer end of the other arm by means of mutually joining the first gripping element and the second gripping element, and said arms, when mutually connected, forming an annular gripping of the handling and/or servicing equipment to the wind turbine tower.

By having at least two arms, compared to, for example, only one arm, the possibility of controlling any displacement of the arms is easier. Also, when transporting the gripping equipment to the site of the wind turbine, two arms take up less space than only one arm. Accordingly, transporting by means of ordinary trucks or other transportation vehicles is possibly easier than with a gripping apparatus only having one arm, the two arms taking up less space.

According to an aspect of the invention the at least one arm is provided at an upper horizontal level above a lower horizontal level of the at least other arm.

Having an upper at least one arm and a lower at least other arm, the gripping capability of the apparatus is improved, and any torques on the wind turbine tower and on the at least two arms of the gripping apparatus is limited.

According to another and preferred aspect of the invention, the gaps between the gripping elements of the outer ends of both the upper at least one arm and of the lower at least one arm are reduced, at least at a point of time when the gripping apparatus has been raised to the position of use, and both the upper at least one arm and the lower at least one arm each are forming an annular gripping apparatus extending around the entire outer circumference of the wind turbine tower.

Having both upper arm/arms and lower arm/arms encircling and gripping around the entire circumference of the wind turbine tower, both the gripping capability and the capability of reducing torques in the tower and in the gripping apparatus are enhanced compared to only having arm/arms at only one level.

According to yet another aspect of the invention, the upper at least one arm, when the gap is being reduced, is forming an annular gripping extending around the entire circumference of the wind turbine tower, and the lower at least one arm, when the gap is being reduced, is forming a partly annular gripping extending over an extension of less than the entire circumference of the wind turbine tower.

Having only upper arm/arms encircling and gripping around the entire circumference of the wind turbine tower, the gripping capability is reduced. However the capability of reducing torques in the tower and in the gripping apparatus is maintained compared to only having arm/arms at only one level.

Thus, in the embodiment mentioned, only the upper arm extends all the way around the circumference of the wind turbine tower, the lower arm is only for a supplemental support, not for gripping, in order to reduce the torques mentioned.

According to an aspect of the invention the gripping apparatus, when in the position of use, is being suspended from the upper part of the wind turbine by means of at least one cable extending from the upper part of the wind turbine, and the gripping apparatus in the position of use furthermore being held to the wind turbine tower by the gripping apparatus by means of the at least one arm of the gripping apparatus, the at least one arm having been encircled around the entire circumference of the wind turbine tower.

By not only having the gripping apparatus gripping around the entire circumference of the tower, but by also having the gripping apparatus suspended in the cables, the risk of the gripping apparatus not being properly maintained in the position of use is reduced, the suspension performing a safety towards the gripping apparatus falling from the position of use, for example, if the gripping capability of the at least one arm is not sufficient or is limited or even void during operation.

According to a possible aspect of the method according to the invention, the gripping apparatus, when being hoisted to the position of use, is being suspended from the upper part of the wind turbine by means of at least one cable extending from the upper part of the wind turbine, and the gripping apparatus when being hoisted to the position of use furthermore being laterally restrained by means of at least one cable extending from a ground object, the at least one cable being kept taut, thereby keeping the gripping apparatus in distance from the wind turbine tower.

By laterally restraining the gripping apparatus during hoisting of the gripping apparatus and the gripping element of the gripping apparatus will not be in contact with the wind turbine tower, even if the hoisting cable or cables extend form a position directly underneath the nacelle so that the cable or cables will extend downwards along the tower. However, by laterally restraining the gripping apparatus at the same time as hoisting the apparatus, the gripping apparatus will be hoisted along a trajectory extending between the ground object and the upper part of the wind turbine, the trajectory not extending along the tower.

According to a further possible aspect of the method according to the invention the gripping apparatus, both during hoisting and when in the position of use, is being suspended from a wire suspension by at least one cable extending from the wire suspension mounted to a supporting structure of the nacelle, the wire suspension being hoisted to the upper part of the wind turbine tower by a nacelle jib being mounted to a supporting structure of the nacelle, the nacelle jib being hoisted to the nacelle and being mounted to the supporting structure preliminary to hoisting the wire suspension to the upper part of the wind turbine tower, and the gripping apparatus being hoisted to the nacelle and being supported by the wire suspension subsequently to hoisting the wire suspension to the upper part of the wind turbine tower.

Providing a wire suspension preliminary being hoisted to the upper part of the wind turbine tower has the advantage that the elements of the nacelle are not occupied or obstructed by equipment for hoisting the gripping apparatus. Furthermore, the wire suspension may be designed and dimensioned for the gripping apparatus in question and for the wind turbine in question.

Thus, hoisting of the gripping apparatus is non-dependent on any onboard hoisting equipment of the wind turbine and hoisting of the gripping apparatus is non-dependent on whether any onboard hoisting equipment is present at all.

In the latter case, it is an advantage providing a nacelle jib which does not constitute part of the onboard equipment, and which may be mounted temporarily to a supporting structure at the upper part of the wind turbine, preferably a frame of the nacelle, alternatively other structures at the upper part of the wind turbine.

According to a preferred aspect of the method according to the invention, the gripping apparatus is provided with at least one crane, the at least one crane extending upwards from the gripping apparatus, and the at least one crane capable of accessing a top of the wind turbine nacelle, when the gripping apparatus is in the position of use on the wind turbine tower, the access to the top of the nacelle being established by one of the following measures: the gripping apparatus being in position of use below the nacelle, when viewed perpendicular to a horizontal plane, and the at least one crane being flexible by having at least one toggle-joint, and the at least one crane extending along the at least one toggle-joint from the gripping apparatus to the top of the nacelle or the gripping apparatus being in position of use set aside in relation to the nacelle, when viewed perpendicular to a horizontal plane, and the at least one crane being rigid by having no toggle-joints, and the at least one crane extending along a rigid structure from the gripping apparatus to the top of the nacelle.

Providing a crane, with or without a toggle-joint, as part of the gripping apparatus or as an add-on equipment to the gripping apparatus enables handling equipment e.g. to and from the nacelle and enables servicing e.g. the nacelle. Possibly, the gripping apparatus according to the invention enables operating the crane from a remote location, so that no personnel need to be present at the crane, at the gripping equipment or in the nacelle when operating of the crane during handling and/or servicing of equipment of the wind turbine. Thus, a much safer handling and/or servicing is obtained for the personnel at the wind turbine site.

According to a possible aspect of the invention the at least one cable connecting the gripping apparatus with an upper part of the wind turbine is being operated by a cable winding or a cable hoisting equipment for winding the at least one cable or for hoisting the gripping apparatus along the at least one cable, the cable winding or hoisting equipment being operated by at least one hydraulic pump, and where the at least one arm of the gripping apparatus being hydraulically encircled around the wind turbine tower, thereby reducing the gap between the gripping elements of the gripping apparatus, the hydraulic encircling being operated by the at least one hydraulic pump also operating the cable winding or hoisting equipment, and where one or more crane booms of the at least one crane is raised towards and/or lowered from the wind turbine nacelle by hydraulic crane actuators for displacing the one or more crane booms, the hydraulic crane actuators being operated by the at least one hydraulic pump also operating the cable winding or hoisting equipment.

Utilising the same hydraulic equipment for both hoisting and lowering the gripping apparatus, and for operating the at lest one arm of the gripping equipment and for operating one or more booms of a crane, results in the possibility of only one hydraulic pumping equipment needed for all operations relating to the gripping apparatus. It reduces the costs of the gripping apparatus, and it reduces the technical complexity of the hydraulic system of the gripping apparatus.

According to an embodiment of the gripping apparatus as such the at least one cable at an upper end is fixed to the wind turbine nacelle and at a lower end are fixed to cable winding or hoisting equipment of the handling and/or servicing equipment mounted to the gripping apparatus.

At least one cable, preferably at least three cables for thereby forming a guided hoisting or lowering of the gripping apparatus, being suspended between the nacelle and the gripping apparatus, has the advantage that the gripping apparatus is hoisted and lowered in relation to the nacelle as such. The nacelle may often be the primary location for any equipment when being employed in relation to handling and/or servicing components of the wind turbine.

According to an embodiment of the invention the at least one arm of the gripping apparatus is provided with at least one friction surface intended for abutting at least part of the outer circumference of the wind turbine tower when the at least one arm is encircling the outer circumference of the wind turbine tower.

The friction surface is of course intended for holding the gripping apparatus at a position of use along the wind turbine tower. However, the friction surface is preferably designed so that any irregularities on the outer surface of the wind turbine tower such as welding seams is accounted for when the at least one arm of the gripping apparatus is encircling the circumference of the wind turbine tower.

According to an embodiment of the invention, the gripping apparatus includes at least one arm, the at least one arm comprising a sequence of a plurality of sections, where each section is pivotally connected to adjacent sections, and where an outer end of the at least one arm is provided with a first gripping element, the first gripping element capable of being mutually joined with a second gripping element of the gripping apparatus, the at least one arm thereby forming an annular gripping member intended for encircling the outer circumference of the wind turbine tower.

Dividing the at least one arm into a plurality of sections results in the flexibility of the at least one arm being enhanced compared to perhaps an arm constituted by only one possibly rigid section. Especially, the flexibility of the gripping apparatus towards gripping wind turbine towers having different cross-sectional dimension along the longitudinal extension of the wind turbine tower is enhanced.

Also, dividing the at least one arm into sections possibly enables one or more sections to be taken from or to be added to the at least one arm. Thereby, the entire circumference which the at least one arm is capable of encircling may be reduced or may be increased depending on the cross-sectional dimension and/or depending on the cross-sectional geometry, i.e. round, oval or polygonal, which the gripping apparatus according to the invention is to be used for.

According to the above-mentioned embodiment the plurality of sections of the at least one arm are controlled by a plurality of actuators for pivoting the plurality of sections in relation to each other in an outwards and inwards sideway direction in a substantially horizontal plane, thereby increasing or reducing the gap between the first gripping element and the second gripping element.

An aspect of the invention also relates to installing a wind turbine, the wind turbine comprising a wind turbine tower, a nacelle and a rotor, and the method comprising the steps of:

positioning a gripping apparatus in immediate vicinity of a lower part of the wind turbine tower below a position of use, connecting the gripping apparatus to an upper part of the wind turbine with at least one cable being suspended from the upper part, raising the gripping apparatus to the position of use by means of the at least one cable by use of cable winding or hoisting equipment, and holding the gripping apparatus onto a side wall of the wind turbine tower by use of at least one arm of the gripping apparatus, the at least one arm having a first configuration where a gap is provided between a first gripping element and a second gripping element, the at least one arm having a second configuration where the first gripping element and the second gripping element are mutually joined, the at least one arm, in the second configuration, forming an annular circumferential gripping member extending around the entire circumference of the wind turbine tower.

The gripping apparatus, especially if used for handling equipment of a wind turbine, may be used already during installation of the wind turbine. When the tower of the wind turbine, or perhaps only some lower sections of the tower, has been installed at the site of installation, the gripping equipment may be used for hoisting equipment further up, such as the nacelle or the rotor, or preferably such as the gearbox, the generator, the main shaft, the transformer or any other equipment to be installed into the nacelle. However, if the gripping apparatus is mounted to lower sections of the wind turbine tower itself, any crane of the gripping apparatus may possibly be used for installing upper sections of the wind turbine tower. This may be beneficial when very tall towers are to be installed.

An aspect of the invention also relates to a wind turbine comprising a gripping apparatus for handling and/or servicing components of a wind turbine, the gripping apparatus comprising at least one arm intended for gripping around the entire circumference of a wind turbine tower, the at least one arm, in one configuration, forming a gap between a first gripping element and second gripping element, and the at least one arm capable of being displaced for enlarging and for reducing the gap, and where the first gripping element and the second gripping element are capable of being mutually joined, the at least one arm, when the first gripping element and the second gripping element are mutually joined, forming an annular gripping member intended for encircling the entire circumference of the wind turbine tower.

The gripping apparatus may constitute part of the wind turbine itself, thus being present at the wind turbine site, perhaps not as part of only one wind turbine during all the operative time of the wind turbine, but possibly being part of a wind turbine park and capable of being used for every wind turbine of the park, when needed. Thus, no separate special crane need to be transported to the site of the wind turbine or the wind turbine park, a gripping apparatus according to the invention and equipped with at least one crane will always be present at the site.

BRIEF DESCRIPTION OF THE INVENTION

The invention will hereafter be described with reference to the drawings, where

Figure 5:
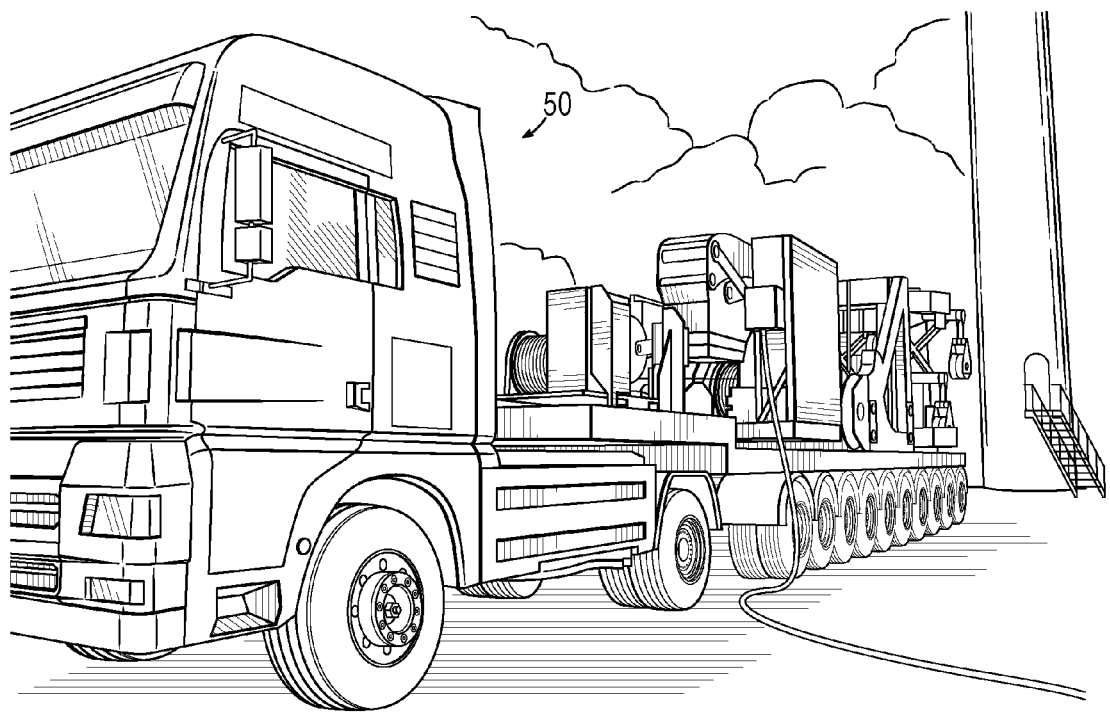
Figure 6:
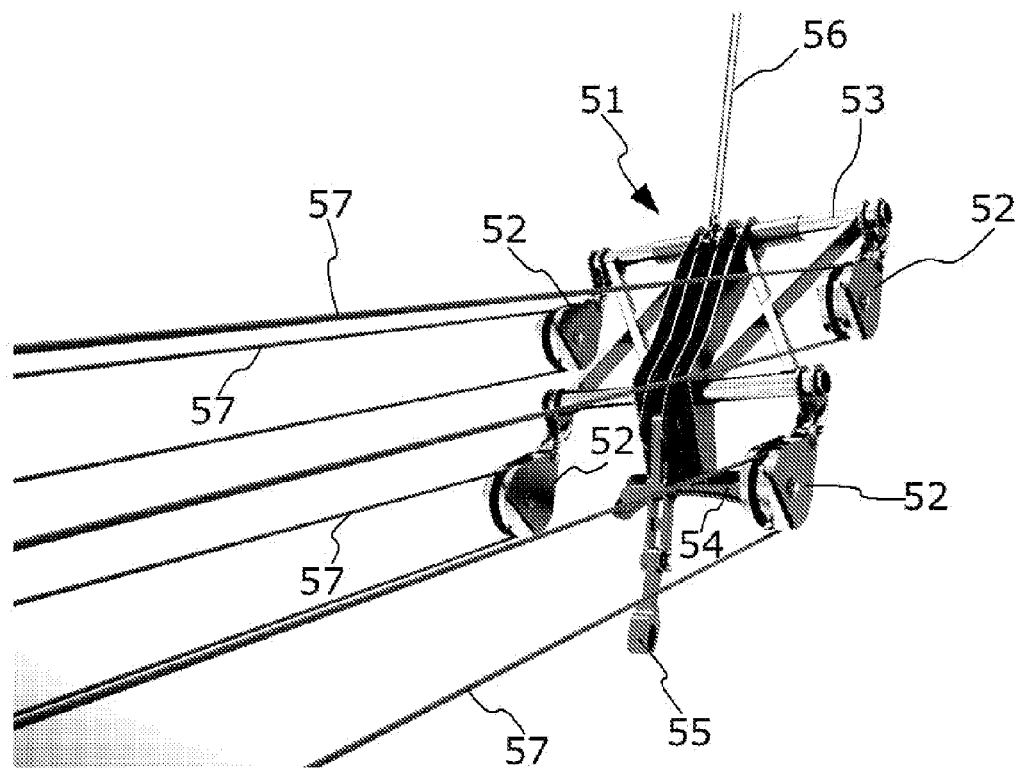
Figure 7:
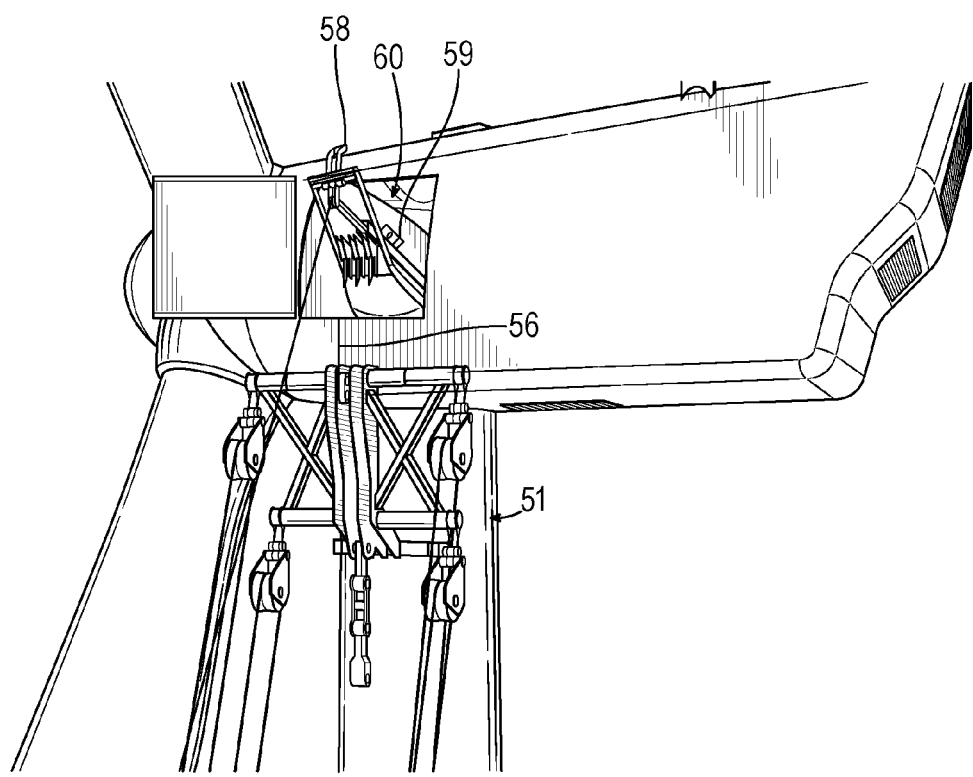
Figure 8:
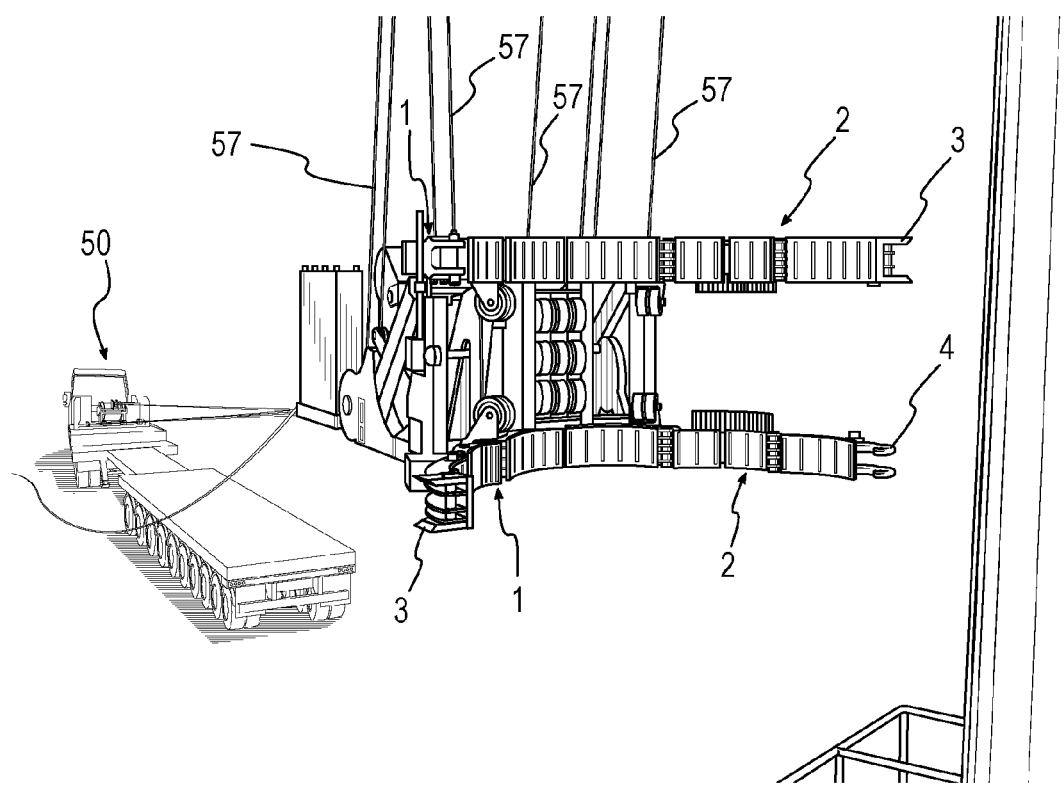
Figure 9:
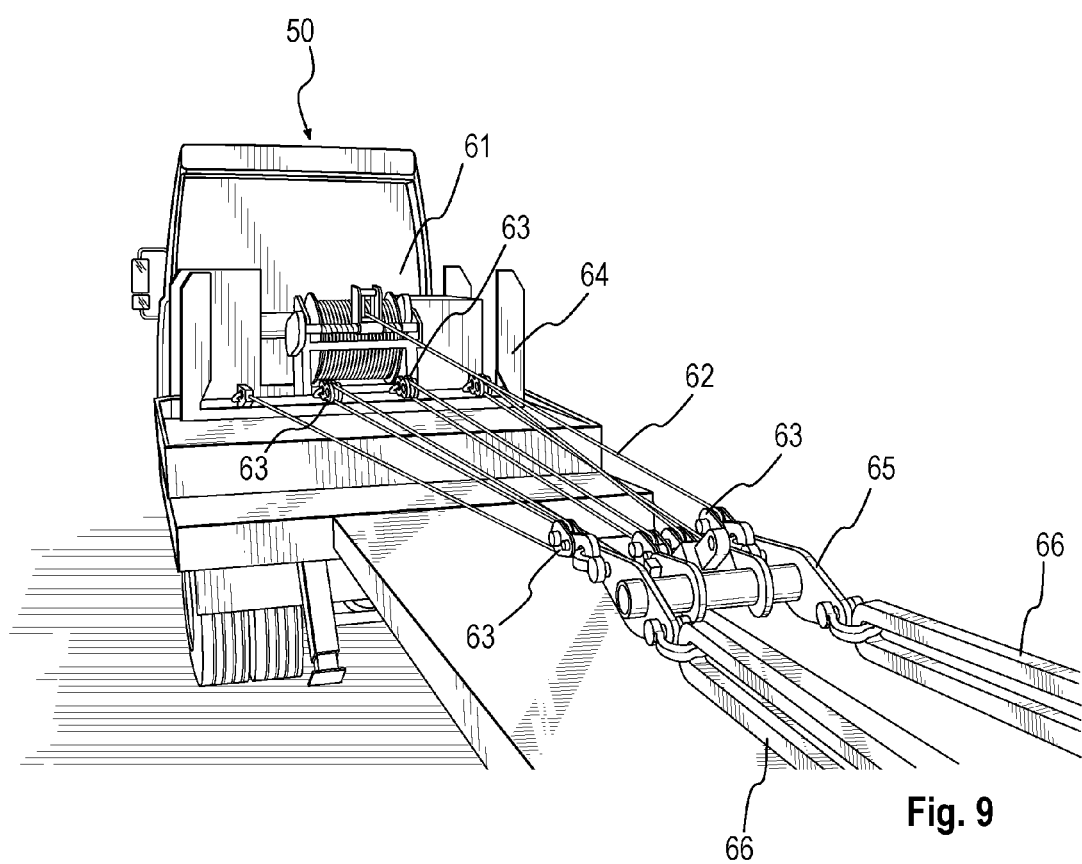

FIG. 1A-1D are plane views and a perspective view of an embodiment of a gripping apparatus of the invention depicted in one possible configuration, FIG. 2A-2D are plane views and a perspective view of the embodiment of a gripping apparatus of the invention depicted in another possible configuration, and FIG. 3A-3D are plane views and a perspective view of the gripping apparatus according to the invention in use and provided with a crane and a work platform FIG. 4A-4D are plane views and a perspective view of a wind turbine with the gripping apparatus in use and provided with a crane and a work platform FIG. 5 is a perspective view of a truck carrying the gripping apparatus according to the invention together with other equipment for hoisting the gripping apparatus, FIG. 6 is a perspective view of a wire suspension according to the invention and being lifted from the truck towards the tower and the nacelle of the wind turbine, FIG. 7 is a perspective view of the wire suspension being in position underneath the nacelle and being secured to and suspended from a nacelle jib, FIG. 8 is a perspective view of the tower crane according to the invention and being lifted from the truck towards the wind turbine tower, and FIG. 9 is a view of a wire winch of a truck, said wire winch being used during hoisting of the gripping apparatus from the truck towards the wind turbine tower.

DETAILED DESCRIPTION OF AN EMBODIMENT OF THE INVENTION

FIG. 1A-1D shows an embodiment of arms for a gripping apparatus according to the invention. The arms are divided into a left arm 1 and a right arm 2, where left and right are as seen in the figures. The left arm 1 and the right arm 2 are identical, apart from gripping elements 3,4 at outer ends 5,6 of the arms. The gripping elements will be described later.

The arms 1,2 are divided into a plurality of sections 11-18, which are mutually joined by hinges 21-29. The number of sections of each arm and the circumferential extension of each of the sections may be different than the number s and circumferential extensions shown in the figures.

In the embodiment shown, each arms 1,2 are both divided into four sections 11-18. A first section 11,12 of each arm extends from a common central hinge 20 between each of the two arms 1,2 and along an angular extension of between 15 and 90°. A second section 13,14 extends from a hinge 21,22 between the first section 11,12 and the second section 13,14 and along an angular extension of between 15 and 90°. A third section 15,16 extends from a hinge 27,28 between the third section 15,16 and the fourth section 17,18 and along an angular extension of between 15 and 90°. The fourth section 17,18 extends from the hinge 27,28 between the third section 15,16 and the fourth section 17,18 and along an angular extension of approximately 15 and 90°. More sections than the ones disclosed may be provided, and the angular extension of each section may be different, either larger or smaller, than the angular extensions disclosed.

The first sections 11,12 are each provided with mounting eyelets 29,30 intended for mounting equipment to the gripping apparatus (see also FIG. 3A-3D). The equipment to be mounted to the arms 1,2 is equipment for handling and/or servicing a wind turbine. Preferably, the equipment is a crane. The mounting eyelets may be substituted by other means of mounting the equipment to the gripping apparatus, depending on the kind of equipment to be mounted.

Each of the sections 11-18 of the two arms 1,2 comprises a pad 31-38 intended for abutting a wind turbine tower, when the gripping arms 1,2 are gripping the tower (see FIG. 3A-3D). The pads 31-38 are preferably made from a material which is resilient so that any possible irregularities on an outside surface of the wind turbine tower such as welding seams will not be exposed to excessive forces when the arms 1,2 are gripping the wind turbine tower. The resilient material of the pads 31-38 may be any suitable elastomer such as rubber, nylon or polypropylene, or the resilient material may be a metal having a relatively low modulus of elasticity, compared to other metals, such as aluminium.

In the embodiment shown, the pads 31-38 are made of a combination of aluminium and rubber, the rubber being provided as an inner material of the pads and intended for immediate abutment with the wind turbine tower, when the gripping arms are gripping the tower, and the aluminium being provided as an outer material of the pads and intended as a support for the rubber.

The pads 31-38 have a curvature corresponding to the curvature of the wind turbine tower to be gripped. In the embodiment shown, the pads have a semi-circular curvature intended for gripping the outer surface a wind turbine tower having a circular cross-section. Alternatively, the pads may have a semi-oval curvature intended for gripping the outer surface a wind turbine tower having an oval cross-section such as a wind turbine tower possibly having an elliptic cross-section. Even in the alternative, the pads may have a plane shape intended for gripping the outer surface of a wind turbine tower having a polygonal cross-section such as a wind turbine tower possibly having a hexagonal cross-section.

Figure 1B:
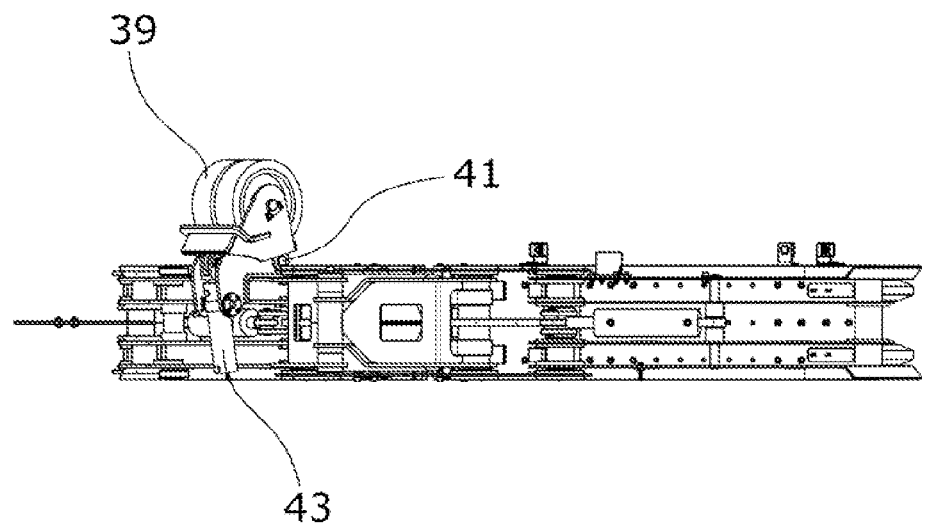
Figure 1C:
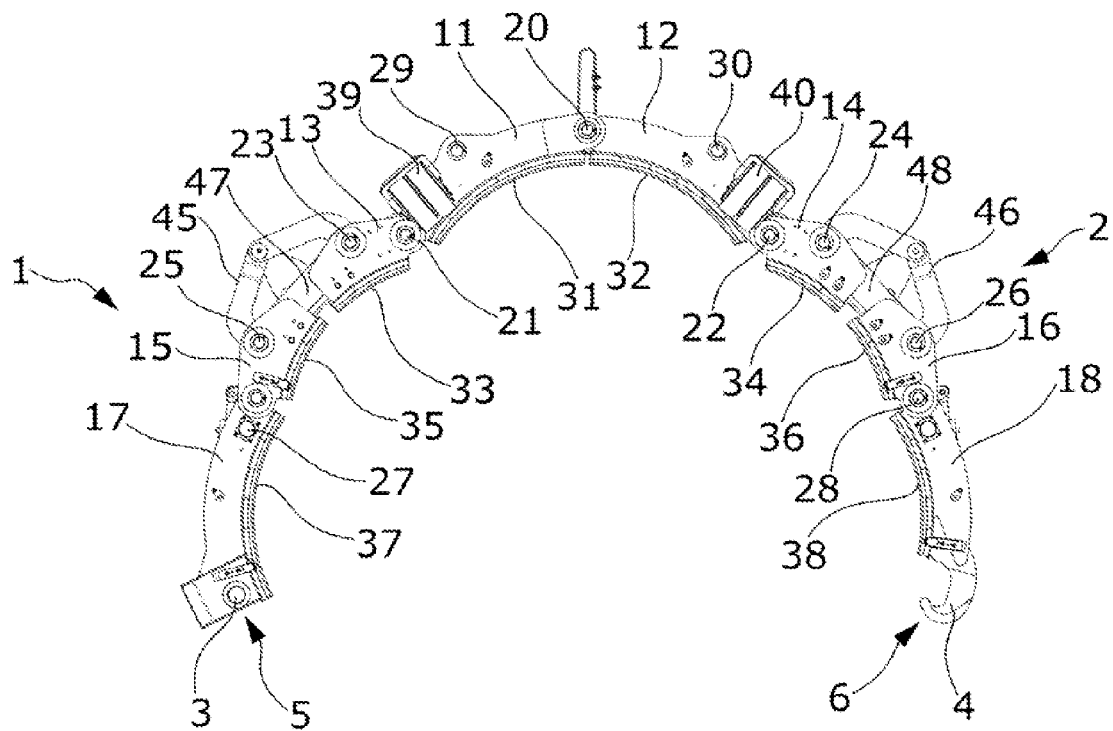
Figure 1D:
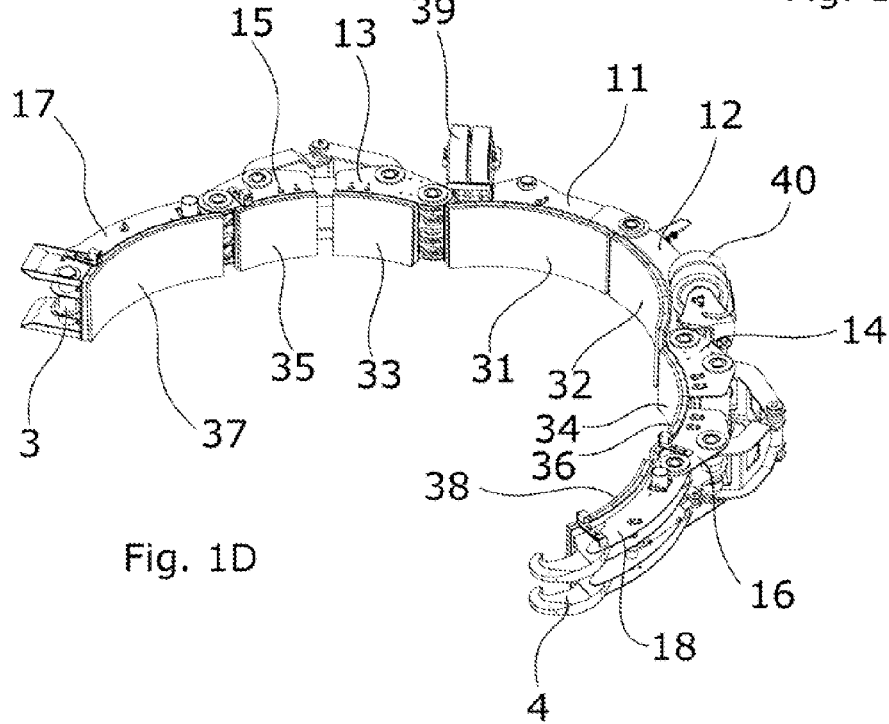
Figure 2A:
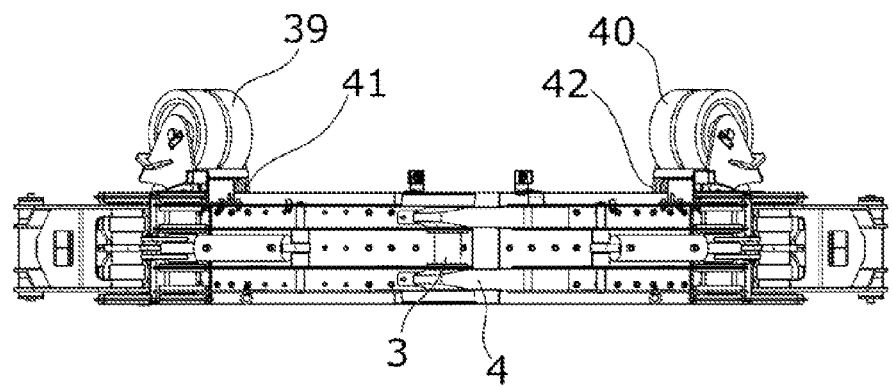
Figure 2B:
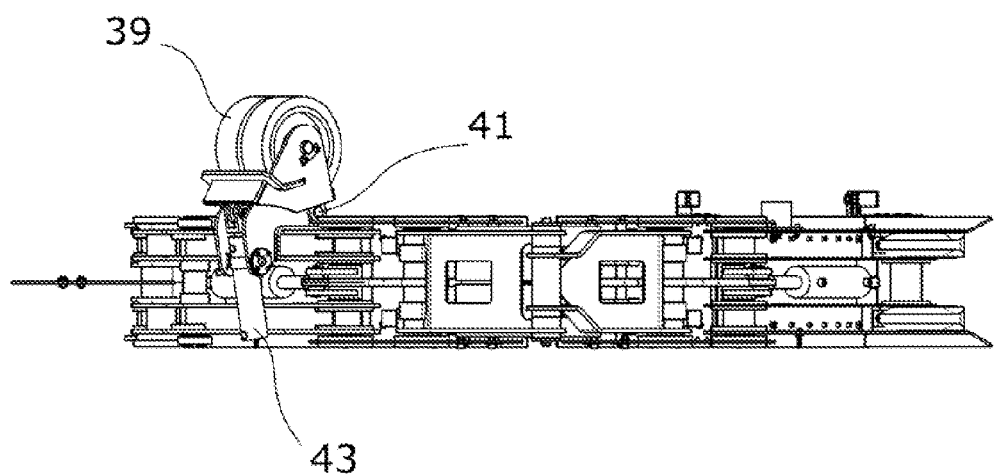
Figure 2C:
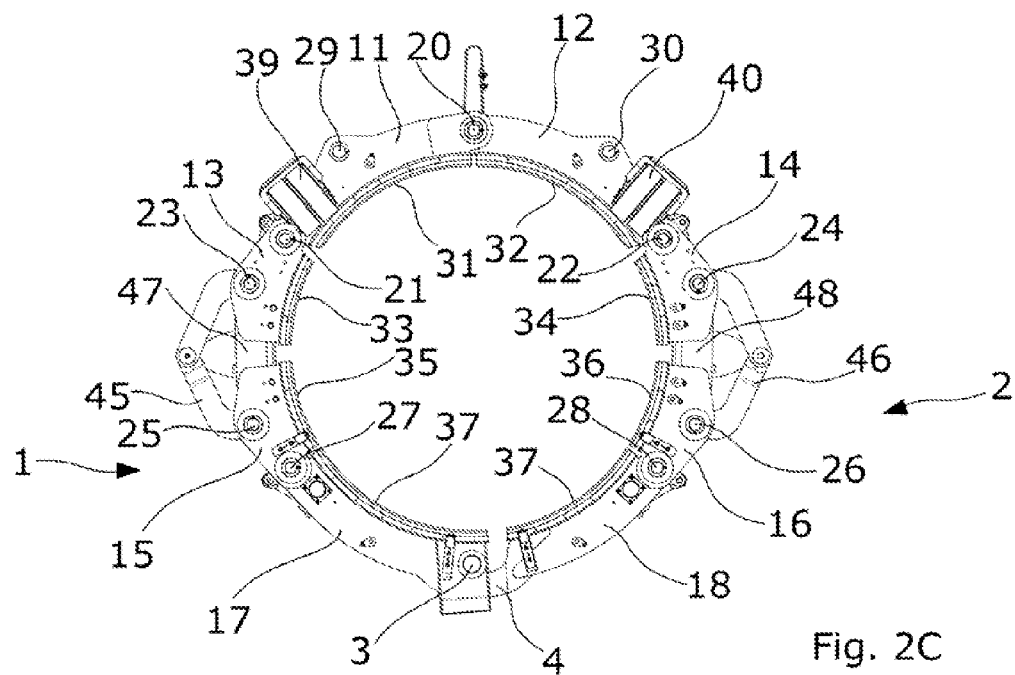
Figure 2D:
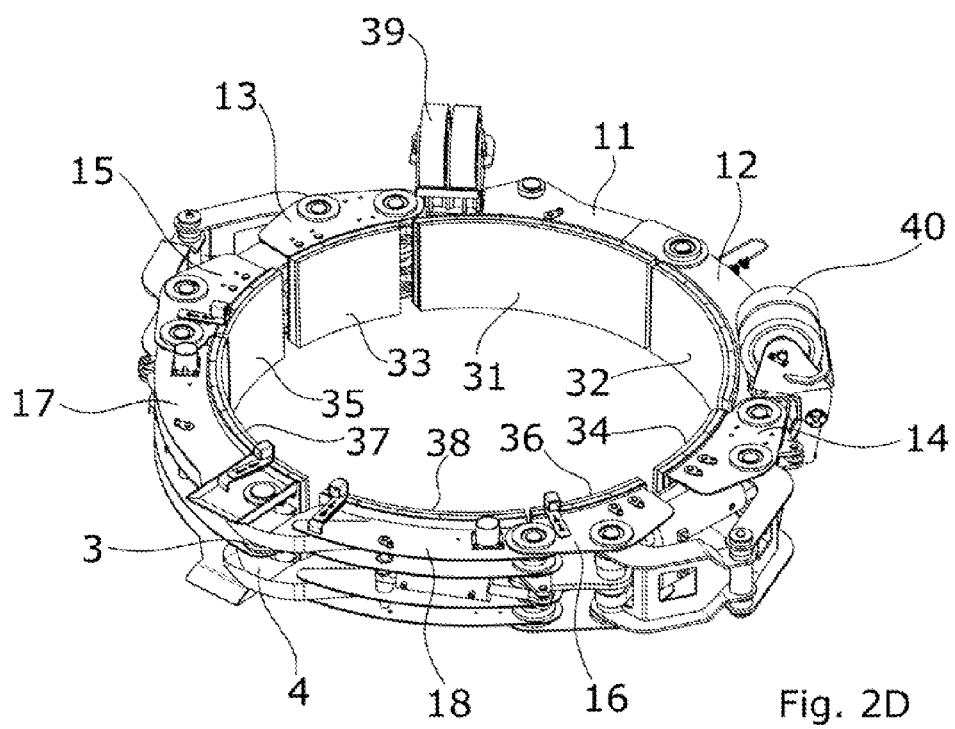
Figure 4D:
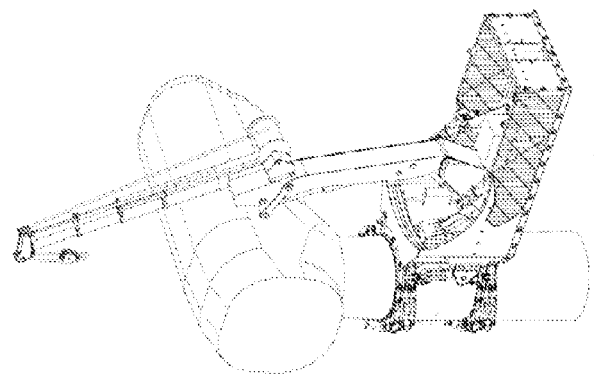
Figure 4B:
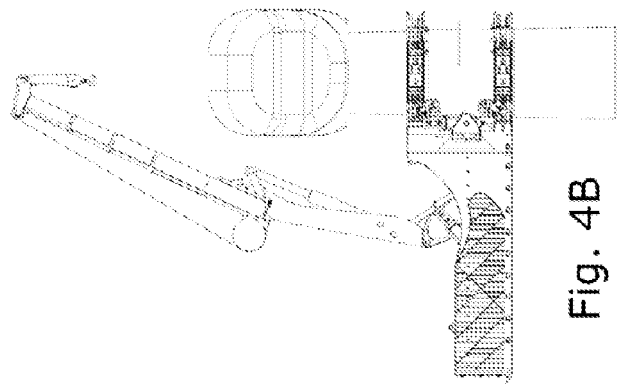
Figure 4C:
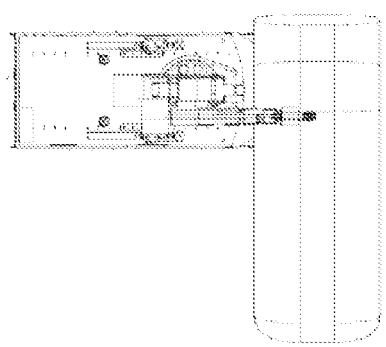
Figure 4A:
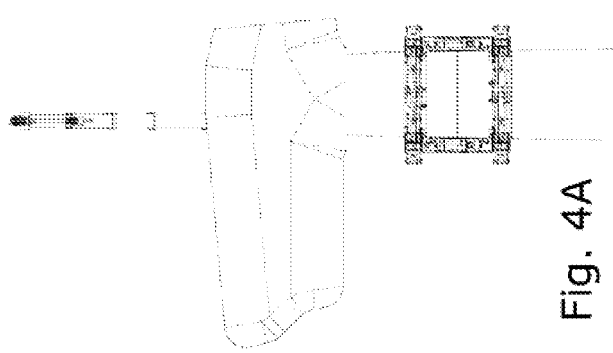

The first sections 11,12 are each provided with supporting rollers 39,40. The supporting rollers 39,40 are intended for supporting the gripping apparatus and any possible equipment such as a crane (see FIG. 3A-3D) during displacement of the equipment up and down along the longitudinal extension of the wind turbine tower to and from the position of use of the equipment. FIG. 1B shows that the supporting rollers 39,40 are mounted to the first sections 11,12 by hinges 41,42 and that actuators 43,44 are provided for pivoting the supporting rollers towards the inner circumference formed by the pads (see FIG. 2A-2D), when the supporting rollers are to engage with the outer surface of the wind turbine tower during displacement of the equipment up and down along the longitudinal extension of the wind turbine tower to and from the position of use of the equipment.

Each of the sections 11-18 of the two arms 1,2 is made of curved beams of metal. Between each of the sections of the two arms, actuators are provided for establishing a mutual pivoting of the sections of the two arms, both when a gap between the outer ends 5,6 of the arms is to be increased, and when the gap is to be decreased. In the embodiment shown, the actuators are hydraulic actuators.

A gripping claw 4 is provided as part of the right arm 2 at the outer end 6 of the arm, i.e. at the end of the fourth section 18 of the right arm 2 being opposite to where the fourth arm 18 is mounted to the third section 16 by the hinge 28. The gripping claw 4 may be pivoted by pivoting the entire section 18 with the actuator being the actuator for pivoting the fourth section 18 in relation to the third section 16.

A gripping bar 3 is provided as part of the left arm 1 at the outer end 5 of the arm, i.e. the end of the fourth section 17 of the left arm 1 being opposite to where the fourth section 17 is mounted to the third section 15 by the hinge 27. The gripping bar 3 4 may be pivoted by pivoting the entire section 17 with the actuator being the actuator for pivoting the fourth section 17 in relation to the third section 15. The gripping bar 3 is intended for the gripping claw 4 to grab when the outer end 5,6 of the two arms 1,2 are to be mutually joined (see FIG. 2A-2D).

When the outer ends 5,6 of the two arms 1,2 are mutually joined by means of the gripping claw 4 grapping the gripping bar 3, the two arms 1,2, including the gripping claw 4 and the gripping bar 3, form an annular gripping apparatus for surrounding the entire circumference of the wind turbine tower at a position of use at a certain level along the longitudinal extension of the wind turbine tower.

The second section 13,14 and the third section 15,16 of each of the two arms 1,2 are mutually connected along a multi-articulate joint 45,46. The multi-articulate joint 45,46 is provided so that second section 13,14 and the third section 15,16 may be mutually displaced along the circumferential extension of the arms 1,2, however still being mutually joined along the multi-articulate joint 45,46. When the gripping claw 4 is in engagement with the gripping bar 3, and immediately after the two arms 1,2 have been passed around the circumference of the wind turbine tower (see FIG. 2A-2D and FIG. 3A-3D), the gripping force of the gripping apparatus is only limited due to the annular inner circumference formed by the gripping apparatus being relatively large compared to the outer circumference of the wind turbine tower at the position of the gripping element.

By displacing the second section 13,14 and the third section 15,16 towards each other along the circumference, the annular inner circumference established by the two arms 1,2 is decreased, and the gripping force around the outer circumference of the wind turbine tower is thus increased. Displacement of the second section 13,14 and the third section 15,16 towards each other along the circumference of the arms 1,2 takes place by an actuator 47,48 (see also FIG. 2A-2D). The actuator 47,48 is joined at one end to the second section 13,14 by a hinged connection 23,24, and the actuator 47,48 is joined at an other end to the third section 15,16 by a hinged connection 25,26.

In the embodiment shown, the actuators 47,48 are hydraulic actuators designed as piston-cylinder hydraulic actuators. In alternative embodiments, the actuators may still be hydraulic actuators, but designed as other actuators than piston-cylinder, such as bellow-type hydraulic actuators.

In even alternative embodiments, the actuators may be mechanical actuators designed as rigging screws. In still even alternative embodiments, the actuators may still be mechanical actuators, but designed as other actuators than rigging screws, such as ratchet-type mechanical actuators.

FIG. 2A-2D show the same elements, i.e. the two arms 1,2, the sections 11-18, the hinges 21-28, the pads 31-39 and the multi-articulate joint 45,46 as the elements shown in FIG. 1A-1D. FIG. 2A-2D show the elements subsequent to the second sections 13,14 and the third sections 15,16 having been pivoted around the hinges 21,22, subsequent to the fourth sections 17,18 having been pivoted around the hinges 27,28, and subsequent to the gripping claw 4 and the gripping bar 3 having been mutually joined. Thereby, a substantially circular, annular inner circumference is established along the pads 31-38.

In the embodiment shown, the pads 31-38 form a circular inner curvature intended for gripping the outer surface a wind turbine tower having a circular cross-section. Alternatively, the pads may form an oval inner circumference intended for gripping the outer surface a wind turbine tower having an oval cross-section such as a wind turbine tower possibly having an elliptic cross-section. Even in the alternative, the pads may from a polygonal inner circumference intended for gripping the outer surface of a wind turbine tower having a polygonal cross-section such as a wind turbine tower possibly having a hexagonal cross-section.

FIG. 3A-3D show the gripping apparatus according to the invention being equipped with a crane and a working platform. The working platform with the crane is mounted to the gripping apparatus at the mounting eyelets 29,28 (see FIGS. 1C and 1D and FIGS. 2C and 2D). In the figures, two gripping apparatuses according to the invention are used for holding the working platform with the crane in a position of use at a location along the longitudinal extension of the wind turbine tower, an upper and a lower gripping apparatus. In the figures, the position of use is just beneath the nacelle of the wind turbine, thus enabling mounting and dismounting of equipment such as the generator, the gearbox or other parts of the nacelle. However, the position of use may also be further down the wind turbine tower, depending on the job which the crane has to perform.

FIG. 4A-4D show a wind turbine tower being conical towards the top of the wind turbine tower. Because of the second section and the fourth section of the gripping apparatuses being mutually displaceable along the inner circumference formed by the pads, and thus also along the outer surface of the wind turbine tower, it is possible to establish inner circumferences, formed by the pads of the gripping apparatus, having different circumferential extensions.

Thus, the upper gripping apparatus will, when the second sections and the third sections of the gripping apparatus are mutually displaced, establish a relatively smaller inner circumferential extension than the lower gripping apparatus, which will establish a relatively larger inner circumferential extension when the second sections and the third sections of the gripping apparatus are mutually displaced.

However, both the upper gripping apparatus and the lower gripping apparatus will still, at each their location along the wind turbine tower, establish a sufficient gripping force around the outer surface of the wind turbine tower.

In alternative embodiments, only one gripping apparatus according to the invention is used for holding the working platform with the crane in a position of use at a location along the longitudinal extension of the wind turbine tower. In even alternative embodiments, more than two gripping apparatuses according to the invention are used for holding the working platform with the crane in a position of use at a location along the longitudinal extension of the wind turbine tower.

In the embodiments shown, the gripping apparatus is provided with two arms extending along the same part of an inner circumference, namely both arms extending halfway round the inner circumference. In an alternative embodiment, the gripping apparatus is provided with only one arm extending all the way along the inner circumference. The only one arm may be provided with more sections than four sections in order of increasing the flexibility of only one arm extending all the way round the inner circumference. Such embodiment may be provided with the gripping bar where the central hinge is provided, and the gripping claw may be provided at the outer end of the only one arm. Thus, mutual joining of the gripping claw and the gripping bar will take place at the location where the central hinge is provided in the embodiment shown.

In the embodiment shown, the decreasing of the extension of the inner circumference is provided by means of the second sections and the third sections being mutually displaceable by means of the multi-articulate joints. In an alternative embodiment, decreasing of the inner circumference is provided by the gripping claw being connected to a section of an arm, such as to the fourth section of the right arm shown, along an actuator enabling displacement of the gripping claw along the inner circumference.

Thereby, all the sections of the one or two arms may be mutually joined by hinges only, with no need for multi-articulate joints. Decreasing the inner circumference takes place after the gripping claw and the gripping bar are mutually joined and by means of displacing the gripping claw, hydraulically or mechanically, in relation to the arm which the gripping claw forms part of.

A working platform need not be provided for supporting the crane. The crane itself may be directly attached to one or more gripping apparatuses according to the invention, also by means of mounting eyelets such as the eyelets shown in FIGS. 2C and 2D and in FIGS. 3C and 3D. Thereby, the weight of the working platform itself is avoided.

Thus, possibly a larger capacity crane may be used or possibly less forces of the one or more gripping apparatuses are needed for holding the crane at the position of use. Directly mounting the crane to one or more gripping apparatuses is possible where the crane is remote controlled and where personnel at the position of use are not needed for operating the crane. Thereby, operation of the crane is also safer for the personnel.

FIG. 5 shows a truck 50 carrying the gripping apparatus (see FIG. 1A-4D and FIG. 8) together with equipment for handling the gripping apparatus. The equipment for handling the gripping apparatus comprises a wire support (see FIG. 6) a nacelle jib (see FIG. 7) and a wire winch of the truck itself (see FIG. 9).

FIG. 6 shows a wire suspension 51 with four wire suspension elements 52. In the embodiment shown the wire suspending elements are pulleys passing a cable, thus increasing the power transmission ratio of the hydraulic or electrical motors on the gripping apparatus when the gripping apparatus is to be hoisted from the truck. In an alternative embodiment, the wire suspending elements may be eyes for attaching one end of a cable to the eyes, possibly by means of shackles.

In the embodiment shown, the wire suspension 51 has a frame 53 supporting the four pulleys 52 in each corner of the frame. In alternative embodiments, the wire suspension may have more or fewer than four pulleys and the pulleys may be positioned in different locations of the frame than in the corners of the frame. The number of pulleys and the position of the pulleys in the frame of the pulley may depend on the design of the wind turbine, especially the design of the nacelle, which the wire suspension is to cooperate with, i.e. how much space is available underneath the nacelle.

The wire suspension has a holdfast 54 facing the tower. The holdfast 54 is intended for abutting the tower when the wire suspension 51 is in position underneath the nacelle (see FIG. 7). Furthermore, the wire suspension 51 is provided with a linkage 55 for linking the wire suspension 51 to the nacelle once the wire suspension 51 has been hoisted to the position underneath the nacelle. The linkage 55 may have a certain extension adapted for the wind turbine in question. By providing a linkage 55 adapted for the wind turbine in question, it is possible to adapt the linkage 55 to a nacelle of a certain type and kind of wind turbine in question.

The wire suspension 51 is hoisted towards the top of the tower by a wire 56 extending from a nacelle jib (see FIG. 7) mounted to a supporting structure of the nacelle. During hoisting, the wire suspension 51 is preferably laterally restrained, thus prevented the wire suspension from clashing into the tower, By being laterally restrained, the wire suspension is furthermore prevented from being dragged upwards along the tower, possibly damaging any surface coating of the tower. Wires 57 being suspended from the wire suspension 51 are allowed to run out from the gripping apparatus, which is still situated on the truck (see FIG. 5). But the wires 57 are kept taut during hoisting of the wire suspension 51 so that the wire suspension 51 is maintained in distance from the tower, until the wire suspension 51 is in position underneath the nacelle (see FIG. 7).

FIG. 7 shows the wire suspension 51 after having been hoisted to the position underneath the nacelle. The wire suspension 51 is hoisted to the nacelle by a single wire 56, the single wire 56 extending from a nacelle jib 58. Preliminary to the wire suspension 51 being hoisted from the truck 50 to the position underneath the nacelle, the nacelle jib 58 is mounted to a supporting structure 59 of the nacelle.

Preliminary to the wire suspension 51, and subsequently the gripping apparatus, being lifted from the truck 50, the nacelle jip 58 is hoisted to the nacelle, either from the outside of the nacelle or inside the tower by an onboard hoisting equipment of the nacelle. In the embodiment shown, the nacelle is provided with a hatch opening 60 through which the nacelle jib 58 is extending after having been mounted to the supporting structure 59 of the nacelle. In the embodiment shown, the supporting structure 59 is a part of the frame structure of the nacelle. Subsequent to mounting of the nacelle jib 58 to the supporting structure 58 of the nacelle, the wire suspension 51 may be lifted from the truck 50, while being suspended in the single wire 56 extending from the nacelle jib 58.

The nacelle jib 58 may be mounted to any supporting structure of the nacelle as long as the supporting structure of the nacelle is capable of withstanding the load of the gripping apparatus with equipment and with any element of the nacelle, for example , the gear box or the generator, which may be intended for being supported by the gripping apparatus during maintenance or replacement. Alternatively, part of the top of the tower, possibly a mounting flange on top of the tower, or any other structural part of the upper part of the wind turbine, the part being capable of withstanding the loads, may be adapted for supporting the nacelle jib.

FIG. 8 shows the gripping apparatus in an intermediate position and being hoisted from the truck 50. The gripping apparatus has the gripping arms 1,2 and the gripping elements 3,4 separated, the gripping arms 1,2 in a position ready for passing around the wind turbine tower, subsequent to which the gripping arms 1,2 will be closed around the tower, and subsequent to which the gripping element 3,4 will be mutually joined for securing the gripping apparatus to the tower.

Hoisting of the gripping apparatus itself takes place by means of wires extending from the gripping apparatus upwards to the wire suspension 51 mounted underneath the nacelle (see FIG. 7) and back to the hydraulic or electrical winches (not shown) mounted on the gripping apparatus. In the embodiment shown, four cables 57 are each extending from the gripping apparatus and around each a pulley 52 of the wire suspension 51 for thereby suspending the gripping apparatus in eight cable extensions in total. Due to this power distribution, the power capacity needed is limited of the winches of the gripping apparatus for hoisting the apparatus.

In alternative embodiments, more or fewer wires may be used, even as few as one wire may be used, said at last one wire possibly being attached by a hook or similar fastening element to the nacelle jib (see FIG. 8). Thereby, the wire suspension may be omitted, and the gripping apparatus will be suspended directly from the nacelle jib. The need for more wires than one or fewer wires than four, and the need for a wire suspension, possibly with pulleys for power distribution, depends on the weight of the gripping apparatus itself, depends on the elements being lifted to or from the nacelle and which are to be supported by the gripping apparatus, depends on the dimensioning of the wire or wires and depends on the possible safety factor used for dimensioning the wire or wires.

FIG. 9 shows a wire winch 61 of the truck 50. The truck 50 is preferably the truck also having transported the gripping apparatus and the equipment for handling the gripping apparatus to the site of the wind turbine. The wire winch 61 is hydraulically or electrically operated, or the wire winch 61 may be operated mechanically by mechanical power transmission from an engine of the truck 50. Alternatively to the wire winch 61 being an integrate wire winch of a truck, as shown, the wire winch may be separate from the truck, but the wire winch may possibly still be operated hydraulically, electrically or mechanically by power from the engine of the truck.

The wire winch 61 is used for laterally restraining the gripping apparatus and thus preventing the gripping apparatus from clashing into the tower. By being laterally restrained the gripping apparatus is furthermore prevented from being dragged upwards along the tower, possibly damaging a surface coating of the tower. A wire 62 of the wire winch 61 is allowed to run out from the wire winch, but the wire is kept taut during hoisting of the gripping apparatus, so that the gripping apparatus is maintained in distance from the tower until the gripping apparatus is in a desired position along the tower (see FIG. 4A-4D).

Only when the gripping apparatus is in the desired location along the tower is the wire 62 from the wire winch 61 allowed to run so far out from the wire winch 61 that the wire loosen, thereby allowing the gripping apparatus to abut the tower and subsequently grip around the tower. According to this preferred method, the truck 50 constitutes a ground object being non-displaced and the taut wire 62 of the wire winch 61 ensuring lateral restraint of the gripping apparatus.

Alternatively to allowing the wire 62 to run out from the wire winch 61, and where the wire 62 is kept taut during hoisting of the gripping apparatus, the wire 62 may be kept taut, during hoisting of the gripping apparatus, by means of the truck 50 driving towards the tower at a speed ensuring possibility of constant hoisting of the gripping apparatus upwards, but at the same time ensuring maintaining the gripping apparatus at a distance from the tower, until the gripping apparatus is in the desired location along the tower.

Only when the gripping apparatus is in the desired location along the tower is the truck 50 driven so far towards the tower that the wire 62 from the truck 50 is allowed to loosen for the gripping apparatus to abut the tower and subsequently grip around the tower. According to this alternative method, the truck 50 constitutes a ground object being displaced and ensuring lateral restraint of the gripping apparatus. Also according to this alternative embodiment, a wire winch 61 may be omitted. A fixed length wire 62 may be used.

In the embodiment shown, pulleys 63 are provided for providing power distribution, thereby reducing the need for power capacity of the wire winch 61. The pulleys are attached to a frame 64 of the wire winch 61 and to an intermediate pulley suspension 65, Furthermore, between the intermediate pulley suspension 65 and the gripping apparatus (not shown), elastomeric elements 66, e.g. rubber strings as shown, is provided for absorbing amplitude and/or frequency of possible oscillations of the gripping apparatus when being hoisted towards a position along the tower.

The forces to be taken up by the wire 62 of the wire winch 61 may however be limited. Therefore, in the alternative, the wire may be substituted by a rope of an elastomeric material such as polyethylene or other material being more or less elastomeric and at the same time having a relatively high tensile strength compared to other elastomeric materials. A rope of an elastomeric material and having a relatively high tensile strength will render the elastomeric string shown in FIG. 9 unnecessary and will possibly increase the safety towards any hazards which may occur due to possible risk of rupture of the elastomeric string.

Even in the alternative, the wire of the wire winch may have enough elasticity to take up a sufficient amplitude and/or frequency of oscillations during hoisting of the gripping apparatus. If that is the case, the elastomeric strips may be omitted.

In the embodiment shown, the gripping apparatus is provided with a crane extending upwards from the gripping apparatus. The crane is capable of accessing a top of the wind turbine nacelle, when the gripping apparatus is in a position of use on a wind turbine tower. Access to the top of the nacelle is established by the gripping apparatus being in position of use set aside in relation to the nacelle, when viewed perpendicular to a horizontal plane, and the crane being rigid by having no toggle-joints. Thus, although the gripping equipment is positioned beneath the nacelle, the crane is still capable of accessing the top of the nacelle.

In an alternative embodiment, the gripping apparatus is provided with a crane also extending upwards from the gripping apparatus. The crane is also capable of accessing a top of the wind turbine nacelle, when the gripping apparatus is in the position of use on a wind turbine tower: However, access to the top of the nacelle being established by the gripping apparatus being in position of use below the nacelle, when viewed perpendicular to a horizontal plane, and the crane being flexible by having at least one toggle-joint. The capability of the crane of accessing the top of the nacelle is enhanced when having at least one toggle joint.

Although the present invention has been described in connection with a specified embodiment, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. Furthermore, individual features mentioned in different claims, may possibly be advantageously combined, and the mentioning of these features in different claims does not exclude that a combination of features is not possible and advantageous.

The invention claimed is:

1. A method of handling and/or servicing components of a wind turbine, said method comprising the steps of:
   positioning a handling and/or servicing equipment in vicinity of a lower part of a wind turbine tower previously having been installed at a wind turbine site,
   connecting the handling and/or servicing equipment to an upper part of the wind turbine with at least one cable being suspended from the upper part,
   raising the handling and/or servicing equipment to a position of use by means of the at least one cable by use of cable winding or hoisting equipment, and
   holding the handling and/or servicing equipment onto a side wall of the wind turbine tower by use of at least one gripping apparatus,
   said at least one gripping apparatus comprising at least one arm for gripping around the wind turbine tower, said at least one arm including a plurality of sections and capable of forming a gap between gripping elements of the apparatus,
   one of said gripping elements being provided at an outer end of the at least one arm, and said gripping elements capable of being mutually joined,
   said at least one arm being encircled around the wind turbine tower, thereby reducing the gap between the gripping elements of the gripping apparatus,
   mutually joining said gripping elements, and when the gripping elements are mutually joined, forming an annular circumferential gripping of the handling and/or servicing equipment to the wind turbine tower, said annular gripping extending around the entire outer circumference, seen perpendicular to a horizontal plane, of the wind turbine tower, and
   activating an actuator coupled to at least one section of the plurality of sections to move the at least one section in a circumferential direction of the at least one arm.

2. The method according to claim 1, where each section of said plurality of sections is pivotally connected to adjacent sections, and where
   said method furthermore comprises that the plurality of sections of the at least one arm are pivoted by a plurality of actuators and said plurality of sections being encircled around the wind turbine tower, thereby reducing the gap between the gripping elements of the gripping apparatus, mutually joining said gripping elements, and when the gripping elements are mutually joined, forming an annular circumferential gripping of the handling and/or servicing equipment to the wind turbine tower, said annular gripping extending around the entire outer circumference, seen perpendicular to a horizontal plane, of the wind turbine tower.

3. The method according to claim 1, said method comprising said gripping apparatus comprising at least two arms for gripping around the wind turbine tower, an outer end of the one arm being provided with a first gripping element and an outer end of another arm being provided with a second gripping element, and said gripping elements capable of being mutually joined, said at least two arms being encircled around the wind turbine tower, thereby reducing a gap between the gripping elements of the gripping apparatus, and mutually connecting the outer end of the one arm and the outer end of the other arm by means of mutually joining the first gripping element and the second gripping element, and said arms, when mutually connected, forming an annular gripping of the handling and/or servicing equipment to the wind turbine tower.

4. The method according to claim 1, where the at least one arm is provided at an upper horizontal level above a lower horizontal level of at least one other arm.

5. The method according to claim 4, where the gaps between the gripping elements of the outer ends of both the upper at least one arm and of the lower at least one other arm are reduced, at least at a point of time when the gripping apparatus has been raised to the position of use, and where both the upper at least one arm and the lower at least one other arm each are forming an annular gripping extending around the entire outer circumference of the wind turbine tower.

6. The method according to claim 4, where the upper at least one arm, when the gap is being reduced, is forming an annular gripping extending around the entire circumference of the wind turbine tower, and where the lower at least one other arm, when the gap is being reduced, is forming a partly annular gripping extending over an extension of less than the entire circumference of the wind turbine tower.

7. The method according to claim 1, wherein the gripping apparatus, when in the position of use, is being suspended from the upper part of the wind turbine by means of at least one cable extending from the upper part of the wind turbine, and said gripping apparatus in the position of use furthermore being held to the wind turbine tower by the gripping apparatus by means of the at least one arm of the gripping apparatus, said at least one arm having been encircled around the entire circumference of the wind turbine tower.

8. The method according to claim 1, where the gripping apparatus, when being hoisted to the position of use, is being suspended from the upper part of the wind turbine by means of at least one cable extending from the upper part of the wind turbine, and said gripping apparatus when being hoisted to the position of use furthermore being laterally restrained by means of at least one cable extending from a ground object, said at least one cable being kept taut, thereby keeping the gripping apparatus in distance from the wind turbine tower.

9. The method according to claim 8, where the gripping apparatus is being suspended from a wire suspension by at least one cable extending from the wire suspension mounted to a supporting structure of the nacelle, said wire suspension being hoisted to the upper part of the wind turbine tower by a nacelle jib being mounted to a supporting structure of the nacelle, said nacelle jib being hoisted to the nacelle and being mounted to the supporting structure preliminary to hoisting the wire suspension to the upper part of the wind turbine tower, and said gripping apparatus being hoisted to the nacelle and being supported by the wire suspension subsequently to hoisting the wire suspension to the upper part of the wind turbine tower.

10. The method according to claim 1, where said gripping apparatus is provided with at least one crane, said at least one crane extending upwards from the gripping apparatus, and said at least one crane capable of accessing a top of the wind turbine nacelle, when the gripping apparatus is in the position of use on the wind turbine tower, said access to the top of the nacelle being established by one of the following measure: the gripping apparatus being in position of use below the nacelle, when viewed perpendicular to a horizontal plane, and the at least one crane being flexible by having at least one toggle-joint, and the at least one crane extending along the at least one toggle-joint from the gripping apparatus to the top of the nacelle or the gripping apparatus being in position of use set aside in relation to the nacelle, when viewed perpendicular to a horizontal plane, and the at least one crane being rigid by having no toggle-joints, and the at least one crane extending along a rigid structure from the gripping apparatus to the top of the nacelle.

11. The method according to claim 1, where the at least one cable connecting the gripping apparatus with an upper part of the wind turbine is being operated by a cable winding or a cable hoisting equipment for winding said at least one cable or for hoisting the gripping apparatus along said at least one cable, said cable winding or hoisting equipment being operated by at least one hydraulic pump, and where the at least one arm of the gripping apparatus hydraulically being encircled around the wind turbine tower, thereby reducing the gap between the gripping elements of the gripping apparatus, said hydraulic encircling being operated by the at least one hydraulic pump also operating the cable winding or hoisting equipment, and where one or more crane booms of the at least one crane is raised towards and/or lowered from the wind turbine nacelle by hydraulic crane actuators for displacing the one or more crane booms, said hydraulic crane actuators being operated by the at least one hydraulic pump also operating the cable winding or hoisting equipment.

12. A gripping apparatus for mounting equipment to a wind turbine tower, said gripping apparatus comprising:

at least one arm for gripping around the wind turbine tower and including a plurality of sections, said at least one arm, in one configuration, forming a gap, and in a second configuration, forming a mutual joining, between a first gripping element and a second gripping element, one of said gripping elements being provided at an outer end of the at least one arm, where the first gripping element and the second gripping element are capable of being mutually joined, said at least one arm, when the first gripping element and the second gripping element are mutually joined, forming an annular gripping apparatus intended for encircling the outer circumference of a wind turbine tower, and an actuator coupled to at least one section of the plurality of sections and configured to move the at least one section in a circumferential direction of the at least one arm when the actuator is activated.

13. The gripping apparatus according to claim 12, where each section of the plurality of sections is pivotally connected to adjacent sections, said plurality of sections of the at least one arm being controlled by a plurality of actuators for pivoting the plurality of sections in relation to each other, thereby increasing or reducing the gap between the first gripping element and the second gripping element.

14. The gripping apparatus according to claim 13, where an outer end of an outer section of the at least one arm is provided with a first gripping element, said first gripping element capable of being mutually joined with a second gripping element of the gripping apparatus.

15. The gripping apparatus according to claim 13, where said plurality of actuators are intended for pivoting the plurality of sections in relation to each other in an outwards and inwards sideway direction in a substantially horizontal plane.

16. The gripping apparatus according to claim 12, said gripping apparatus comprising:

at least two arms intended for gripping the outer circumference of the wind turbine tower, said at least two arms, in the first configuration, forming a gap between a first gripping element at an outer end of one arm and a second gripping element at an outer end of another arms, and the outer end of the one arm and the outer end of the other arm, in a second configuration, being capable of being mutually connected by means of the first gripping element and the second gripping element, and said arms, when mutually connected, forming an annular sequence of gripping arms intended for encircling the outer circumference of the wind turbine tower.

17. The gripping apparatus according to claim 12, where the gripping apparatus is provided with handling and/or servicing equipment being mounted to the gripping apparatus, said handling and/or servicing equipment comprising at least one cable for connecting the gripping apparatus with an upper part of the wind turbine, and said handling and/or servicing equipment comprising cable winding or hoisting equipment for winding or unwinding said at least one cable or for hoisting or lowering the gripping apparatus along the at least one cable.

18. The gripping apparatus according to claim 12, where said at least one cable at an upper end are fixed to the wind turbine nacelle and at a lower end are fixed to cable winding or hoisting equipment of the handling and/or servicing equipment mounted to the gripping apparatus.

19. The gripping apparatus according to claim 12, where the at least one arm of the gripping apparatus is provided with at least one friction surface intended for abutting at least part of the outer circumference of the wind turbine tower when the at least one arm is encircling the outer circumference of the wind turbine tower.

20. The gripping apparatus according to claim 12, where said gripping apparatus includes a left side arm and a right side arm, when viewed perpendicular to a horizontal plane, and where the left side arm and the right side arm are displaceable in relation to each other, and where the left side arm is provided with a first gripping element and the right side arm is provided with a second gripping element, said first gripping element and second gripping element capable of being mutually joined.

21. The gripping apparatus according to claim 12, said gripping apparatus comprising at least one upper arm being provided at a horizontal level above another at least one lower arm.

22. A wire suspension for suspending a gripping apparatus according to claim 12, said wire suspension comprising one or more wire suspension elements for suspending one or more wires extending from the gripping apparatus, and comprising at least one linkage for mounting the wire suspension to a supporting structure at an upper part of the wind turbine, said wire suspension intended for being hoisted to the upper part of the wind turbine preliminarily to hoisting the gripping apparatus.

23. A nacelle jib for hoisting a wire suspension according to claim 22 to an upper part of the wind turbine, said nacelle jib comprising an element for temporarily mounting the nacelle jib to a supporting structure of the upper part of the wind turbine, and comprising a wire or other downwards supporting element for hoisting the wire suspension to the upper part of the wind turbine, said wire jib capable of being hoisted to the upper part of the wind turbine by an onboard crane of a nacelle of the wind turbine, said nacelle jib intended for being hoisted to the upper part of the wind turbine preliminarily to hoisting the wire suspension.

24. A method of installing a wind turbine, said wind turbine comprising a wind turbine tower, a nacelle and a rotor, and said method comprising the steps of:

positioning a gripping apparatus in immediate vicinity of a lower part of the wind turbine tower below a position of use, connecting the gripping apparatus to an upper part of the wind turbine with at least one cable being suspended from the upper part, raising the gripping apparatus to the position of use by means of the at least one cable by use of cable winding or hoisting equipment, and holding the gripping apparatus onto a side wall of the wind turbine tower by use of at least one arm of the gripping apparatus, said at least arm including a plurality of sections, said at least one arm having a first configuration where a gap is provided between a first gripping element and a second gripping element, said at least one arm having a second configuration where the first gripping element and the second gripping element are mutually joined, said at least one arm, in the second configuration, forming an annular circumferential gripping extending around the entire circumference of the wind turbine tower, and activating an actuator coupled to at least one section of the plurality of sections to move the at least one section in a circumferential direction of the at least one arm.

25. The method according to claim 24, where
each section of the plurality of sections is pivotally connected to adjacent sections, and where
said method furthermore comprises that the plurality of sections of the at least one arm are pivoted by a plurality of actuators,
said plurality of sections of the at least one arm, in the second configuration, forming an annular circumferential gripping extending around the entire circumference of the wind turbine tower.

26. A wind turbine comprising a gripping apparatus for handling and/or servicing components of a wind turbine, said gripping apparatus comprising:
at least one arm intended for gripping around the entire circumference of a wind turbine tower and including a plurality of sections, said at least one arm, in one configuration, forming a gap between a first gripping element and second gripping element, and said at least one arm capable of being displaced for enlarging and for reducing said gap, where
the first gripping element and the second gripping element are capable of being mutually joined, said at least one arm, when the first gripping element and the second gripping element are mutually joined, forming an annular gripping apparatus intended for encircling the entire circumference of the wind turbine tower, and
an actuator coupled to at least one section of the plurality of sections and configured to move the at least one section in a circumferential direction of the at least one arm when the actuator is activated.

27. The wind turbine according to claim 26, where
each section of the plurality of sections is pivotally connected to adjacent sections,
said plurality of sections of the at least one arm being controlled by a plurality of actuators for pivoting the plurality of sections in relation to each other, thereby increasing or reducing the gap between the first gripping element and the second gripping element.

28. The method according to claim 7, where the gripping apparatus is:
being suspended from a wire suspension by at least one cable extending from the wire suspension mounted to a supporting structure of the nacelle,
said wire suspension being hoisted to the upper part of the wind turbine tower by a nacelle jib being mounted to a supporting structure of the nacelle,
said nacelle jib being hoisted to the nacelle and being mounted to the supporting structure preliminary to hoisting the wire suspension to the upper part of the wind turbine tower, and
said gripping apparatus being hoisted to the nacelle and being supported by the wire suspension subsequently to hoisting the wire suspension to the upper part of the wind turbine tower.

29. The gripping apparatus according to claim 14, where said plurality of actuators are intended for pivoting the plurality of sections in relation to each other in an outwards and inwards sideway direction in a substantially horizontal plane.

30. The method according to claim 1, further comprising:
adjusting a circumference of the circumferential gripping while the first gripping element and the second gripping element are mutually joined.

31. The method according to claim 30, further comprising:
adjusting the circumference of the circumferential gripping using the actuator coupled to the at least one arm.

32. The gripping apparatus according to claim 12, wherein the at least one section is displaceable such that a circumference of the annular gripping apparatus may be adjusted while the first gripping element and the second gripping element are mutually joined.

33. The gripping apparatus according to claim 32, wherein the actuator is configured to move the at least one section to adjust the circumference of the annular gripping apparatus while the first gripping element and the second gripping element are mutually joined.

34. The method according to claim 24, further comprising:
adjusting a circumference of the circumferential gripping while the first gripping element and the second gripping element are mutually joined.

35. The method according to claim 34, further comprising:
adjusting the circumference of the circumferential gripping using the actuator coupled to the at least one arm.

36. The wind turbine according to claim 26, wherein the at least one section is displaceable such that the annular gripping apparatus may be adjusted while the first gripping element and the second gripping element are mutually joined.

37. The wind turbine according to claim 36, wherein the actuator is configured to move the at least one section to adjust the annular gripping apparatus while the first gripping element and the second gripping element are mutually joined.

* * * * *

UNITED STATES PATENT AND TRADEMARK OFFICE
CERTIFICATE OF CORRECTION

| | | |
|---|---|---|
| PATENT NO. | : 8,939,299 B2 | Page 1 of 1 |
| APPLICATION NO. | : 12/809759 | |
| DATED | : January 27, 2015 | |
| INVENTOR(S) | : Claus Ahler et al. | |

It is certified that error appears in the above-identified patent and that said Letters Patent is hereby corrected as shown below:

In the Specification:

At column 4, line number 13, change "torques" to --torque--

At column 5, line number 13, change "and" to --,-- and at line 15 change "form" to --from--

At column 6, line number 41, change "lest" to --least-- and at line 49 change "are" to --is--

Signed and Sealed this
Twenty-ninth Day of December, 2015

Michelle K. Lee
*Director of the United States Patent and Trademark Office*